(12) United States Patent
Boka et al.

(10) Patent No.: US 12,025,751 B2
(45) Date of Patent: Jul. 2, 2024

(54) SYSTEM AND METHOD FOR COMPENSATING A MOTION OF A VEHICLE COMPONENT

(71) Applicant: KNORR-BREMSE Systeme fuer Nutzfahrzeuge GmbH, Munich (DE)

(72) Inventors: Jeno Boka, Dunakeszi (HU); Adam Szoellosi, Budapest (HU); Gabor Seres, Budapest (HU); Balazs Gal, Budapest (HU); Andras Batai, Pecs (HU); Viktor Tihanyi, Budapest (HU); Andras Szappanos, Budajeno (HU); Huba Nemeth, Budapest (HU); Csaba Horvath, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 301 days.

(21) Appl. No.: 17/433,697

(22) PCT Filed: Jan. 28, 2020

(86) PCT No.: PCT/EP2020/052012
§ 371 (c)(1),
(2) Date: Aug. 25, 2021

(87) PCT Pub. No.: WO2020/173642
PCT Pub. Date: Sep. 3, 2020

(65) Prior Publication Data
US 2022/0050190 A1     Feb. 17, 2022

(30) Foreign Application Priority Data

Feb. 25, 2019   (EP) .................................... 19159015

(51) Int. Cl.
*G01S 7/497*      (2006.01)
*G01S 7/40*       (2006.01)
(Continued)

(52) U.S. Cl.
CPC ................ *G01S 7/497* (2013.01); *G01S 7/40* (2013.01); *G01S 7/52004* (2013.01);
(Continued)

(58) Field of Classification Search
CPC ........ G01S 7/40; G01S 7/497; G01S 7/52004; G01S 13/862; G01S 13/865;
(Continued)

(56) References Cited

U.S. PATENT DOCUMENTS

2002/0072869 A1   6/2002   Stiller
2008/0269976 A1   10/2008  Birgersson
(Continued)

FOREIGN PATENT DOCUMENTS

CN    101156045 A    4/2008
CN    106476728 A    3/2017
(Continued)

OTHER PUBLICATIONS

International Search Report (PCT/ISA/210) issued in PCT Application No. PCT/EP2020/052012 dated May 4, 2020 (three (3) pages).

(Continued)

*Primary Examiner* — Yuqing Xiao
*Assistant Examiner* — Benjamin Richard Hebert
(74) *Attorney, Agent, or Firm* — Crowell & Moring LLP

(57) ABSTRACT

A system compensates a motion of a vehicle component relative to another vehicle component or ground. One or more sensors are supported by the vehicle component. The system includes a control unit configured to perform the following acts: receiving sensor data from the one or more sensors; detecting the motion of the vehicle component; and determining compensation data to enable a compensation of deviations in sensor data that are caused by the motion.

8 Claims, 3 Drawing Sheets

(51) Int. Cl.
| | |
|---|---|
| *G01S 7/52* | (2006.01) |
| *G01S 13/86* | (2006.01) |
| *G01S 13/931* | (2020.01) |
| *G01S 15/931* | (2020.01) |
| *G01S 17/86* | (2020.01) |
| *G01S 17/931* | (2020.01) |

(52) U.S. Cl.
CPC .......... *G01S 13/931* (2013.01); *G01S 15/931* (2013.01); *G01S 17/931* (2020.01); *G01S 13/862* (2013.01); *G01S 13/865* (2013.01); *G01S 13/867* (2013.01); *G01S 17/86* (2020.01)

(58) Field of Classification Search
CPC .... G01S 13/867; G01S 13/931; G01S 15/931; G01S 17/86; G01S 17/931; G01S 2013/9327; G05D 1/0231
See application file for complete search history.

(56) References Cited

U.S. PATENT DOCUMENTS

| | | | |
|---|---|---|---|
| 2014/0379229 A1* | 12/2014 | Walz | E02F 3/964 |
| | | | 701/50 |
| 2015/0317781 A1 | 11/2015 | Napier et al. | |
| 2016/0055509 A1* | 2/2016 | Nyberg | G06F 16/22 |
| | | | 705/14.1 |
| 2016/0134799 A1 | 5/2016 | Karam et al. | |
| 2017/0061710 A1* | 3/2017 | Saeger | G07C 5/02 |
| 2017/0371348 A1* | 12/2017 | Mou | G06V 20/56 |
| 2018/0284243 A1* | 10/2018 | Wood | G05D 1/0234 |
| 2019/0163201 A1* | 5/2019 | Jensen | G05D 1/0891 |
| 2020/0183008 A1* | 6/2020 | Chen | G01S 17/89 |

FOREIGN PATENT DOCUMENTS

| | | |
|---|---|---|
| DE | 10 2017 005 607 A1 | 12/2018 |
| JP | 8-44428 A | 2/1996 |
| JP | 2010-70012 A | 4/2010 |
| JP | 2015-535204 A | 12/2015 |
| KR | 20150041945 A | 4/2015 |
| WO | WO 2018/142057 A1 | 8/2018 |

OTHER PUBLICATIONS

English-language Written Opinion (PCT/ISA/237) issued in PCT Application No. PCT/EP2020/052012 dated May 4, 2020 (eight (8) pages).
European Search Report issued in European Application No. 19159015.7 dated Sep. 11, 2019 (nine (9) pages).
Japanese-language Office Action issued in Japanese Application No. 2021-549608 dated Oct. 26, 2022 with English translation (15 pages).
European Office Action issued in European Application No. 19159015.7 dated Dec. 15, 2022 (six (6) pages).
Chinese-language Office Action issued in Chinese Application No. 202080016664.0 dated Mar. 31, 2023 with English translation (19 pages).
Chinese Office Action in corresponding Application No. 202080016664.0 dated Oct. 19, 2023 with English translation (26 pages).
Davide Scaramuzza,, "Exploiting Motion Priors in Visual Odometry for Vehicle-Mounted Cameras with Non-holonomic Constraints" 2011 IEEE/RSJ international Conference on Intelligent Robots and Systems, Sep. 25, 2011 (8 pages).
Kong, Dong, "Road boundary identification algorithm based on 3D LIDAR point cloud", Journal of Guangxi University, vol. 42, No. 3, Jun. 2017, including English abstract (9 pages).
"Design of automobile attitude data acquisition system based on integrated navigation", Automotive Electronics, 2017, including English abstract (6 pages).

* cited by examiner

SYSTEM AND METHOD FOR COMPENSATING A MOTION OF A VEHICLE COMPONENT

BACKGROUND AND SUMMARY OF THE INVENTION

The present invention relates to a system and a method for compensating a motion of a vehicle component relative to another vehicle component or ground and, in particular, to a movement compensation in ground perceptions of sensors on commercial vehicles.

In particular, the autonomous operation of transport vehicles needs more and more sophisticated functions based on a high-end hardware and software infrastructure including various types of environment sensors. Therefore, such commercial vehicles are equipped with an increasing number of sensor units to capture more and more details of the environment around the vehicle.

It is common to mount these sensors at a vehicle cabin, partly because the cabin is the highest part of the commercial vehicle and provides thus a good overview of the environment and surrounding of the vehicle. On the other hand, a typical suspension of the cabin allows considerable movements/displacements between the cabin and the chassis/undercarriage which significantly influences the perception results of the environment sensors. This may result in deviations in the sensor data resulting in errors, for example, when measuring a distance to a preceding vehicle. For many applications, in particular for autonomous operations, this is not acceptable.

WO 2018/142057 discloses a conventional device for calibrating a perception system that includes lidar range finders, wherein calibration parameters are determined from at least one video camera and the detection of landmarks. Another conventional system is disclosed in US 2015/317781, which uses an extrinsic calibration of imaging sensing devices and generates a 3D point cloud based by multiple sensors. In particular, this system is based on a combination of a camera and a lidar system to obtain the calibration parameters.

Although these systems can be used for calibrating sensing devices on vehicles, these conventional systems take not into account relative a motion of a cabin relative to the ground or the undercarriage of the commercial vehicles.

Therefore, there is a demand for systems that can overcome at least some of the mentioned problems.

At least some of the problems of the conventional systems are overcome by a system, a method and a computer program product according to the independent claims. The dependent claims refer to further advantageous realizations of the subject matter of the independent claims.

The present invention relates to a system for compensating a motion of a vehicle component relative to another vehicle component or to ground, wherein one or more sensors are supported by the vehicle component. The system includes a control unit configured to perform the following steps:
  receiving sensor data from the one or more sensors;
  detecting the motion of the vehicle component; and
  determining compensation data to enable a compensation of deviations in sensor data that are caused by the motion.

The vehicle component may be any component of the vehicle such as a cabin, a frame, a chassis, an undercarriage, etc. The component is, in particular, independently suspended compared to other vehicle components. This independent suspension may cause during operation the motion of the component relative to other vehicle components (e.g. the wheels during operation), which shall be compensated. The corresponding compensation of sensor data of various sensors of the vehicle may be performed in the control unit or in any other control unit. The compensation may be used to improve environment perception, which is of particular advantage for autonomous driving.

The one or more sensors may be multiple sensors that are supported or held by the vehicle component or by further vehicle components. Optionally, the control unit is further configured to base the determination of the compensation data on data received by one or more of the multiples sensors. Furthermore, the control unit may be configured to provide the compensation data for corrections of sensor data from some or all of the multiple sensors. Thus, the compensation data may be based on data of one sensor, but are used also for other sensors on the vehicle.

The vehicle component may be a cabin of a commercial vehicle and the control unit may be configured to determine a position and/or a deviation of the position of the cabin relative to ground, which may again be based on the detected motion of the one or more sensors.

The vehicle component may be a chassis or an undercarriage of a commercial vehicle and the control unit may be configured to determine a position and/or a deviation of the position of the chassis relative to ground.

Optionally, the control unit is further configured to:
  correct sensor data based on the determined position or deviation of the position of the cabin; and/or
  correct sensor data based on the determined position or deviation of the position of the chassis.

Optionally, the control unit is configured to use one of the sensors for determining a ground plane relative to the vehicle component. The ground plane may be a surface of a road or street.

The one or more sensors may be configured to generate a point cloud from ground reflections detected by the one or more sensors (e.g. a LIDAR) and the control unit may be configured to determine the ground plane based on the point cloud. The determined ground plane may be used for the determination of the compensation data. The determination of the ground plane may be carried out by a statistical regression analysis to fit a plane to the point cloud. It is understood, that during operation of the vehicle (e.g. driving on a road) the determined ground plane will not be static relative to the vehicle component but will change in accordance with the detected motion. This change may be compensated by using the compensation data.

Optionally, the control unit may be configured to determine the ground plane based on sensor data from a combination of sensors of the one or more sensors and optional further sensors of the vehicle. For example, all sensor data may be merged before determining the ground plane. It may also be possible that each of these sensors determines a ground plane and this redundancy may be used to improve the accuracy (e.g. by averaging or another statistical analysis).

The vehicle may include further sensors for obtaining vehicle data and/or environment data and the control unit may be configured to base the determination of the compensation data in part on the vehicle data and/or environment sensor data. The vehicle data may relate to the vehicle velocity, load, braking events, cornering etc. The environmental data may include navigational data, weather conditions (e.g. snow), road inclinations etc.

Further embodiments allow dynamic corrections of received sensor data (e.g. in any control unit of the vehicle) during operation of the vehicle. In particular, during operation of the vehicle the control unit may compensate sensor data from arbitrary sensors based on the correction information—at least as long as they are affected by the relative motion.

Embodiments relate also to a commercial vehicle with a component that is independently suspended from other vehicle components and with at least one sensor supported by (e.g. mounted on) the component. The vehicle includes a system as mentioned before. Optionally, the one or more sensors include one or more of the following sensors: a LIDAR (=light detecting and ranging), a mono and/or a stereo camera, a radar, an ultrasonic sensor.

Yet another embodiment relates to a method for compensating a motion of a component of a vehicle relative to another vehicle component or ground, wherein at least one sensor is mounted on the component. The method includes the steps of:
  receiving sensor data from the at least one sensor;
  detecting the motion of the component; and
  determining compensation data to enable a compensation of deviations in sensor data that are caused by the motion.

Optionally, the method may include a continuous determining of compensation data during operation of the vehicle to enable a dynamic correction of sensors data received from various sensors of the vehicle.

Furthermore, any function of the described system may be implemented by further optional method steps.

The method may also be implemented in software or a computer program product and the order of steps may not be important to achieve the desired effect. Embodiments of the present invention can, in particular, be implemented by software or a software module in any ECU (electronic control unit) of the vehicle. Therefore, embodiments relate also to a computer program having a program code for performing the method, when the computer program is executed on a processor.

Embodiments of the present invention solve at least some of the above-mentioned problems by a system that is able to estimate a ground (or a ground plane) relative to an actual position of a frame (or any relative movable component) of the vehicle on which one or more of the exemplary perception sensors may be mounted. This frame may either be the cabin or the chassis of the commercial vehicle or any other independently suspended part of the vehicle. This frame is subject to displacements (or any movements) due to dynamical forces acting during operation of the vehicle. From the data of at least one of the environment perception sensors the system is able to estimate the displacement of the frame relative to the ground or relative to another vehicle component. The displacement may not only relate to translational movements in one of the three spatial axes, but can also include rotations or oscillations or swinging movements of the respective vehicle component. This determined displacement is used to compensate the respective errors in the sensor data (e.g. correcting distances to a vehicle ahead).

In contrast to conventional systems, embodiments take into account and subsequently compensate relative motions of vehicle components. Therefore, embodiments may not be used as a calibration of environment sensors as such (or at least not only), but to take into consideration the mentioned relative displacements and to enable their dynamical compensation.

A particular advantage of embodiments relates to the fact that it allows a real time estimation of the displacement of the frame relative to ground and allows thus a better transformation of the sensor data of frame-mounted sensors to a coordinate system associated with the vehicle (as whole). Therefore, a better and more accurate perception of the environment is achieved. Especially, it improves the localization precision of objects detected by the sensor(s) significantly.

Some examples of the systems and/or methods will be described in the following by way of examples only, and with respect to the accompanying figures.

BRIEF DESCRIPTION OF THE DRAWINGS

FIG. 2 depicts a commercial vehicle with a cabin subject to (relative) motions that, according to further embodiments, are to compensated for;

DETAILED DESCRIPTION OF THE DRAWINGS

Figure 1:
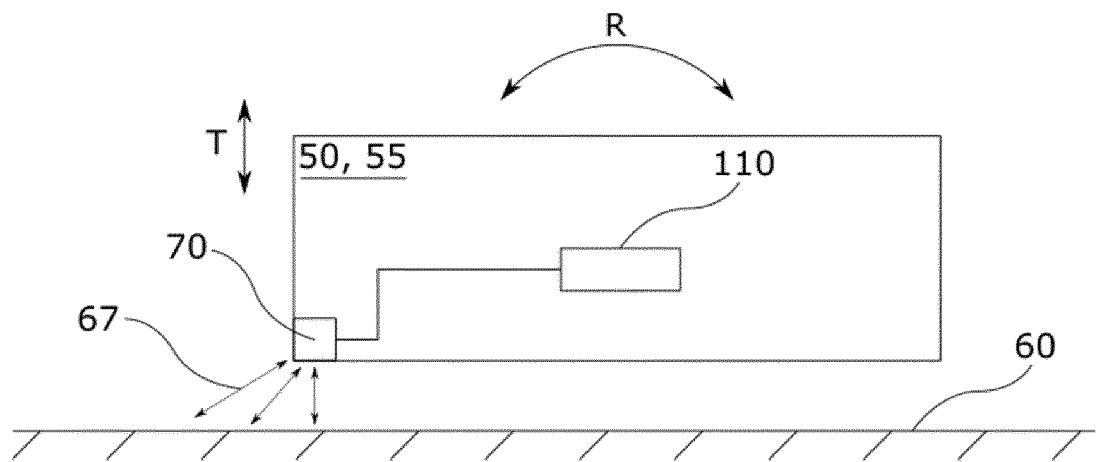
FIG. 1 depicts a system for compensating a motion of a vehicle component relative to a basis according to an embodiment of the present invention.

FIG. 1 depicts a system according to an embodiment of the present invention for compensating a motion of a vehicle component 50, 55 with a sensor 70 (or more sensors). The vehicle component 50, 55 may be a cabin 50 or any other independently suspended component of a commercial vehicle. The motion may relate to a displacement or a translational motion T, but may also be any kind of swinging or rotating motion R of the vehicle component 50, 55. The system includes at least one control unit 110 that is configured to perform at least the following steps:
  receiving sensor data from the sensor 70;
  detecting the motion R, T of the component 50, 55; and
  determining compensation data to enable a compensation of deviations in sensor data that are caused by the motion R, T.

The sensor 70 may be configured to detect a ground 60 and to determine any motion of the vehicle component 50, 55 relative to the ground 60 or another vehicle component. To achieve this, the sensor 70 may be a LIDAR (=light detecting and ranging) sensor that creates a point cloud from the reflections 67 from the ground 60, which may be a surface of a road or street. From this point cloud the control unit 110 may be configured to fit a plane by a statistical regression analysis. If the component 50, 55 is subject to the motion R, T the determined plane will change (relative to the component 50, 55). From this analysis the control unit 110 may determine the amount change, which may be a rotation angle or a more general coordinate transformation associated with a rotational/swinging motion of the component 50, 55 relative to ground.

By continuously monitoring the ground surface 60, the control unit 110 is able to detect any deviation over time during operation of the commercial vehicle and to produce compensation data that are suitable to compensate the relative motion R, T of the component 50, 55.

Figure 2:
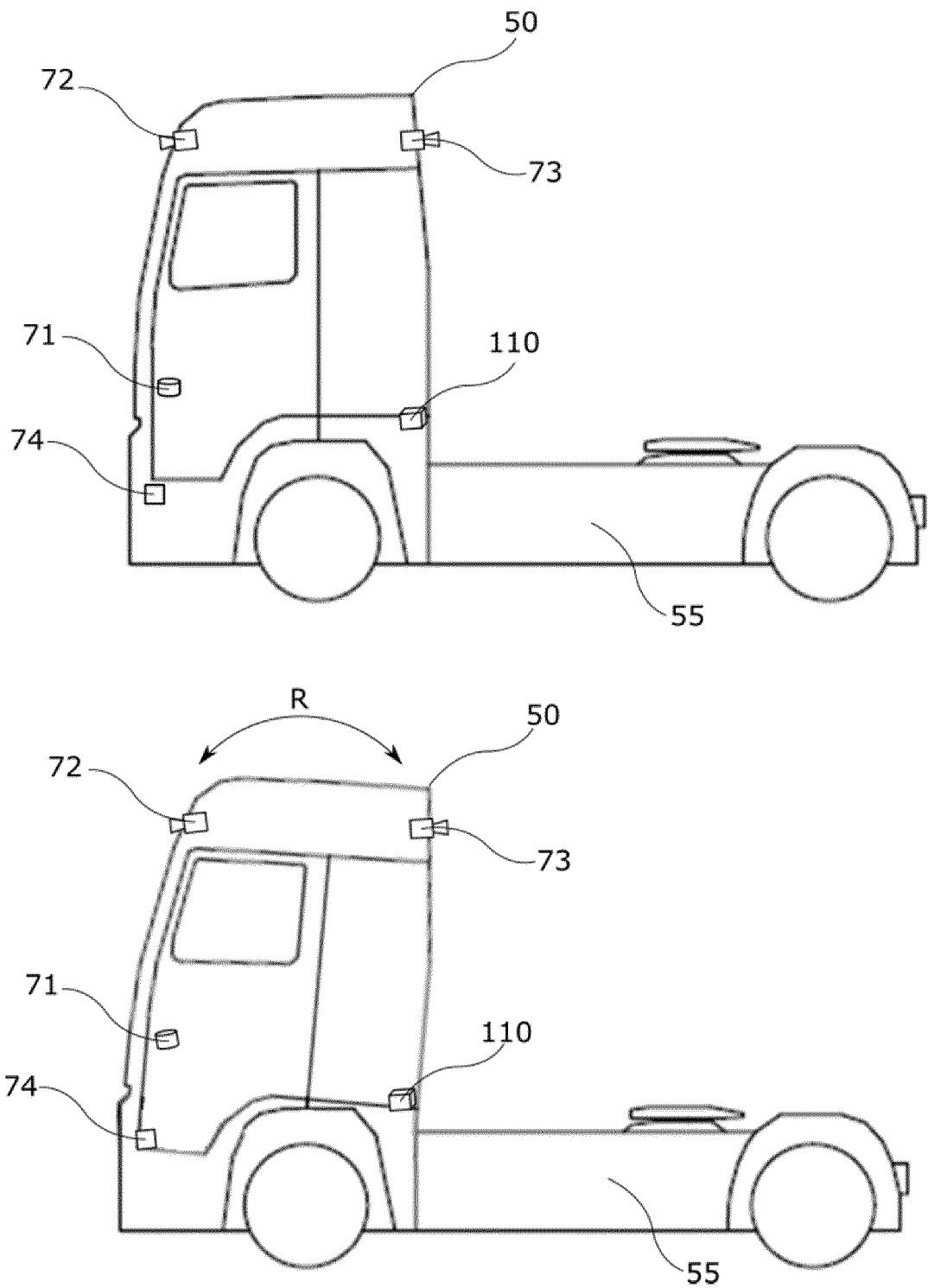

FIG. 2 depicts a commercial vehicle with a cabin 50 that supports multiple sensors 71, 72, . . . that may be used as perceptional sensors. The sensor 70 in FIG. 1 may be one of them. The sensors may include a first sensor 71, a second sensor 72 and a third sensor 73 and a fourth sensor 74. The sensors 71 . . . 74 may be mounted directly to the cabin 50, but may also be mounted to any kind of frame and move together with the cabin 50 during operation of the commercial vehicle. The first sensor 71 includes, for example, a LIDAR sensor, the second sensor 72 may include a front-facing camera (2D or 3D), the third sensor 73 includes for example a backward-facing camera, and the fourth sensor 74 includes, for example, a radar or an ultrasonic sensor.

The cabin 50 is mounted to a chassis 55 and may include the control unit 110. Since the suspension of such cabins 50 is optimized for driver comfort, it allows significant movements relative to the vehicle chassis 55 or relative to the ground 60. Thus, the cabin 50 may not be rigidly mounted on a chassis or undercarriage 55, but may swing R about a rotational axis that lies within a horizontal plane, e.g., parallel to the ground surface 60 (see lower part of FIG. 2). The suspension of the exemplary cabin 50 may allow, for example, a movement in any degree of freedom between the cabin 50 and the chassis 55 and/or relative to the ground 60. The movements R,T are caused by dynamic forces acting on the vehicle such as braking and/or accelerating and/or potholes and/or cornering or other movements that cause a force on the cabin 50.

The exemplary rotation R influences the various sensors 71, 72, . . . in that the resulting sensor data should be corrected to enable reliable results. In other words, the movement R of the cabin 50 is to compensate before relying on the respective sensor data. For example, such movements have the effect that the sensor data or the derived quantities from the sensor data are less accurate so that a transformation allowing a conversion between the ground 60 and the instantaneous vehicle coordinate system is needed. In other words, the coordinate system of the sensor itself is affected by these relative movements and an initial calibration is not valid any longer.

An estimation for this movement can be obtained by detecting the ground plane 60. If the relative movement to the ground plane 60 compared to the frame (movable vehicle component 50, 55) on which the sensors 71, 72, . . . are secured is known, the transformation of the sensor data into the coordinate system of the vehicle or the ground can be corrected, namely with the correct frame displacement information. As a result, the sensor displacement resulting from the movement of the cabin 50 can be compensated, thereby improving the accuracy of the resulting sensor results.

At least one of the perception sensors 71, 72, 73, 74 may, for example, determine the exemplary point cloud to obtain at any time the ground plane 60 during the vehicle operation. It is also possible to obtain the ground plane 60 based on radar imaging or using one or more ultrasonic sensors. The relative movement of the cabin 50 to the chassis 55 and/or of the chassis 55 to the ground 60 may then be estimated or determined and the results are used to compensate the perception results of any of these sensors installed on the same frame 71 to 74.

In addition, the sensors 71, 72, . . . may be initially calibrated (reference calibration) on the ground plane. The reference calibration can for example be obtained during the first setup of the sensors 71, 72, . . . and is obtained at standstill of the vehicle. The compensation data may be derived by comparing the determined ground plane 60 with the initially calibration ground plane that may be stored in the control unit 110 or another storage. From this comparison the control unit 110 may obtain a transformation between both coordinate systems, the vehicle coordinate system at standstill and the coordinate system during the motion of the component.

The control unit 110 may be arranged in the cabin 50 or at any other position in the vehicle and receives the sensor data from the sensors 71, 72, . . . . The control unit 110 can be any kind of electronic control unit of the vehicle, which is adapted (by installing respective software) to determine and to provide the compensation data. The compensation data may be any kind of information that is suitable for correcting the sensor data from the various sensors 71, 72, . . . or from other sensors to compensate the motion R, T of the exemplary cabin 50 during operation. This compensation can be performed dynamically during operation of the vehicle to compensate continuously consecutive motions R, T of the vehicle component 50.

The estimation of the exemplary frame movement relative to the ground plane 60 allows further a compensation of a displacement of any other sensor mounted to the same frame. For example, when in FIG. 2 the displacement correction is derived from a first sensor 71, the results may also be used for the cameras 72 and 73 while taking into account the different position of these objects on the cabin 50, because the relative position of the first sensor 71 to the second sensor 72 and the third sensor 73 does not change during the motion R,T. In other words, the determined compensation can be used to transform the coordinate system of the frame (vehicle component 50, 55) back the initial coordinate system where the initial calibration was based on. As a result, any sensor data from sensors using the same coordinate system can be compensated.

The same principles may be used for sensors on other vehicle frames which in turn can be compensated by determining the change in their coordinate system.

Figure 3:
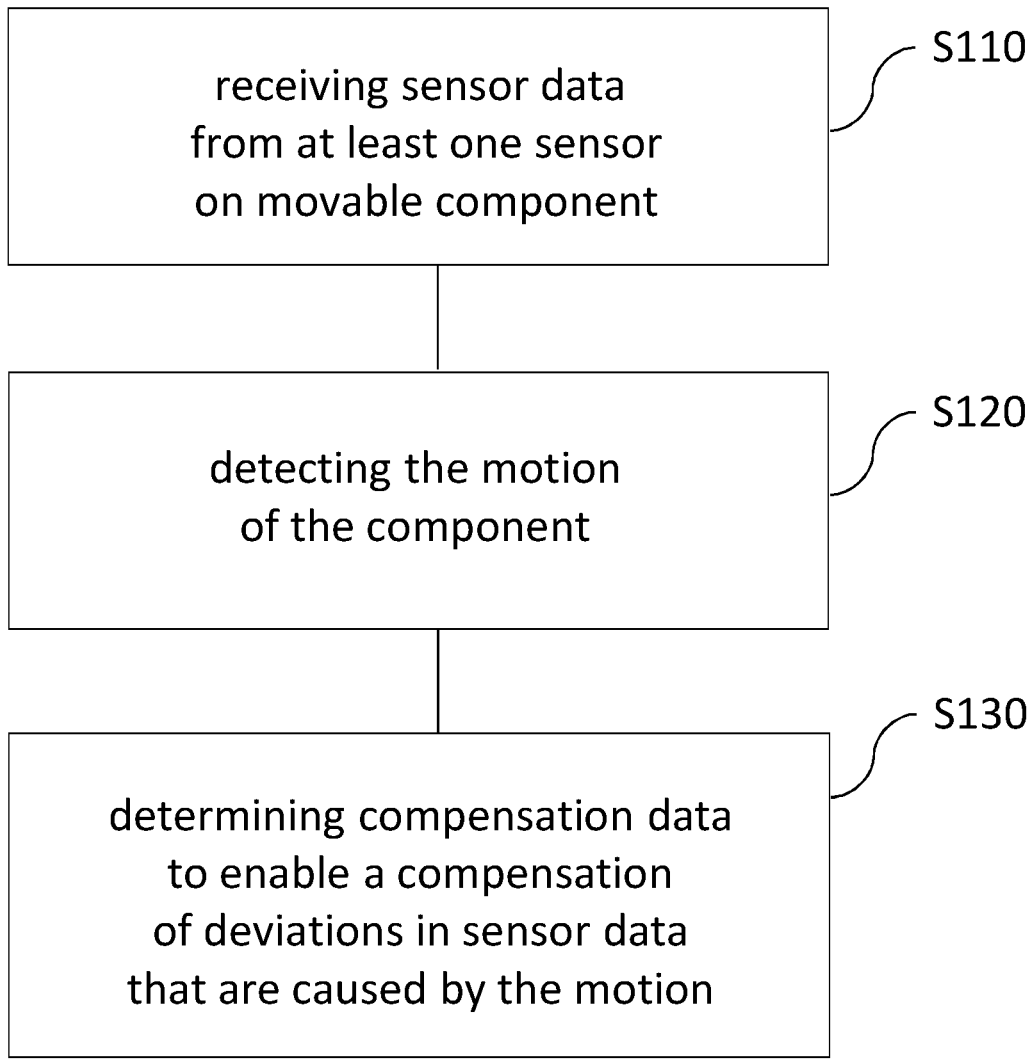
FIG. 3 is a flow chart of a method according to yet another embodiment.

FIG. 3 depicts a flow diagram of a method for compensating a motion R, T of a component 50, 55 of a vehicle relative to another vehicle component or to ground 60, wherein at least one sensor 70 is mounted on the component 50, 55. The method comprises the steps of:
  receiving S110 sensor data from the at least one sensor 70;
  detecting S120 the motion R, T of the component 50; and
  determining S130 compensation data to enable a compensation of deviations in sensor data that are caused by the motion R, T.

This method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

A particular advantage of embodiments of the present invention relates to the fact that it is made possible to have a real-time estimation of the position of the component 50, 55 that holds the perception sensors 71, 72, . . . relative to the ground plane 60. This estimation can be derived from one or more of the sensors 71, 72, . . . that detect the environment and that are capable of detecting the ground plane 60.

It is understood that within the present invention the sensors 71, 72, . . . from which the ground plane 60 can be estimated shall not be limited to particular sensors. Moreover, the embodiments of the present invention shall not be limited to an estimation of the ground plane 60 but may also be used to derive any relative movement with respect to another object or component of the vehicle.

The compensation data can also be used to improve the perception quality of the environment which is needed, for example, for object detection, free space detection or other functions provided by the multiple sensors. This way, a better perception of the environment can be achieved, in particular when implemented in an autonomous commercial vehicle it allows a safer operation of that vehicle.

Advantageous embodiments include one or more of the following:

They relate to an environment perception system for commercial vehicles, wherein the perception system calculates the position of an independently suspended component of the commercial vehicle relative to the ground plane 60 using at least one environment perception sensor 70 mounted to the same frame 50, 55.

They further relate to an environment perception system for commercial vehicles, wherein the perception system calculates the cabin position relative to the ground plane 60 from its environment perception sensors 70 mounted on the cabin 50.

They further relate to an environment perception system for commercial vehicles, wherein the perception system calculates the chassis position relative to the ground plane 60 from its environment perception sensors 70 mounted on the undercarriage 55.

In the environment perception system the environment perception sensor data may be corrected with the estimated ground relative cabin position.

In the environment perception system the environment perception sensor data may be corrected with the estimated ground relative undercarriage position.

In the environment perception the ground plane estimation may be based on fitting a plane to a point cloud, after segmenting the ground points.

In the environment perception the sensor 70 detecting the ground plane 60 may be at least one LIDAR 71.

In the environment perception the sensor 70 detecting the ground plane 60 may be at least one mono or stereo camera 72, 73.

In the environment perception the sensor 70 detecting the ground plane 60 may be at least one radar 74.

In the environment perception the sensor 70 detecting the ground plane 60 may be at least one ultrasonic sensor 74.

In the environment perception the sensor 70 detecting the ground plane 60 may be a combination of sensors as mentioned before.

In the environment perception the perception sensor data may be compensated with data calculated by a control system.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS

50 (independently suspended) vehicle component, cabin
55 chassis
60 ground
67 reflection(s)
70, 71, . . . sensor(s)
110 control unit
R,T movements (rotation, displacements, translations, etc.)

The invention claimed is:

1. A system for compensating a motion of a vehicle component relative to ground, the system comprising:
one or more sensors supported by said vehicle component;
a control unit operatively configured to:
receive sensor data from said one or more sensors;
detect said motion of said vehicle component; and
determine compensation data to enable a compensation of deviations in sensor data that are caused by said motion;
wherein said control unit is configured to use one of said sensors for determining a ground plane relative to said vehicle component;
wherein said vehicle component comprises a cabin of a commercial vehicle, wherein said cabin is independently suspended from a chassis of said commercial vehicle, and
wherein the control unit is further configured to determine a position or a deviation of said position of said cabin relative to ground.

2. The system according to claim 1, wherein the one or more sensors are multiple sensors supported by said vehicle component or by further vehicle components, and
the control unit is further configured to:
base said determination of said compensation data on data received by one or more of said multiples sensors; and
provide said compensation data for corrections of sensor data from some or all of said multiple sensors.

3. The system according to claim 1, wherein the control unit is further configured to:
correct sensor data based on the determined position or deviation of said position of said cabin relative to ground.

4. The system according to claim 1, wherein
the one or more sensors are configured to generate a point cloud from ground reflections detected by said one or more sensors, and
the control unit is further configured to determine said ground plane based on said point cloud and to use the determined ground plane for the determination of said compensation data.

5. The system according to claim 1, wherein
the control unit is configured to determine said ground plane based on sensor data from a combination of sensors of said one or more sensors and optional further sensors of said commercial vehicle.

6. The system according to claim 1, wherein
the commercial vehicle includes further sensors for obtaining vehicle data and/or environment data, and
the control unit is further configured to base the determination of said compensation data in part on the vehicle data and/or environment sensor data.

7. A method for compensating a motion of a component of a vehicle relative to ground, wherein at least one sensor is supported by said component, the method comprising:
receiving sensor data from said at least one sensor;
detecting said motion of said component;

determining compensation data to enable a compensation of deviations in sensor data that are caused by the motion, and wherein one of said sensors is used for determining a ground plane relative to said vehicle component, wherein the vehicle component comprises a cabin of a commercial vehicle, wherein said cabin is independently suspended from a chassis of said commercial vehicle; and determining a position or a deviation of said position of said cabin relative to ground.

8. The method according to claim 7, further comprising:

continuously determining compensation data during operation of said commercial vehicle to enable a dynamic correction of sensors data received from various sensors of said commercial vehicle.

\* \* \* \* \*